United States Patent

Vollmer

Patent Number: 5,830,347
Date of Patent: Nov. 3, 1998

[54] CLEANING MECHANISM FOR A FLUID FILTER

[75] Inventor: Rudolf Vollmer, Mosbach, Germany

[73] Assignee: Honeywell AG, Offenbach am Main, Germany

[21] Appl. No.: 847,803

[22] Filed: Apr. 28, 1997

Related U.S. Application Data

[63] Continuation of Ser. No. 579,998, Dec. 20, 1995, abandoned.

[30] Foreign Application Priority Data

Dec. 24, 1994 [EP] European Pat. Off. ............... 94120635

[51] Int. Cl.$^6$ .................................................... B01D 33/50

[52] U.S. Cl. ............................ 210/107; 210/108; 210/132; 210/355; 210/411; 210/413; 210/414

[58] Field of Search ....................................... 210/107, 108, 210/355, 411, 413, 414, 131, 132

[56] References Cited

U.S. PATENT DOCUMENTS

| 431,448 | 7/1890 | Dixon | 210/355 |
| 4,308,142 | 12/1981 | Braukmann et al. | |

FOREIGN PATENT DOCUMENTS

| 497176 | 7/1978 | Australia | 210/355 |
| 626536 | 2/1936 | Germany | 210/354 |
| 563832 | 8/1944 | United Kingdom | 210/355 |

*Primary Examiner*—W. L. Walker
*Attorney, Agent, or Firm*—Edward L. Schwarz

[57] ABSTRACT

A filter assembly has a cylindrical filter element immersed in the fluid to be filtered, and which fluid normally flows radially inwards through the filter element and is thereby filtered. When the filter element is to be cleaned by backflushing, fluid flowing inwardly through the filter element is impelled by a rotating pump vane which directs fluid within the filter element outwardly at relatively high through the filter element thereby dislodging debris which may have adhered to the exterior of the filter element.

7 Claims, 2 Drawing Sheets

CLEANING MECHANISM FOR A FLUID FILTER

This application is a continuation, of application Ser. No. 08/579,998, filed Dec. 20, 1995, now abandoned.

BACKGROUND OF THE INVENTION

The present invention is an improvement to the backflush mechanism of an existing fluid filter device which is particularly applicable for filtering water. This existing fluid filter device is described in U.S. Pat. No. 4,308,142 to Braukmann et al. and will be referred to hereafter as the Braukmann filter. U.S. Pat. No. 4,308,142 is hereby incorporated into this application by reference.

To aid the reader's understanding of the instant invention, it is useful to briefly describe the Braukmann filter. The Braukmann filter has a normal mode and a backflush mode of operation. There is a cylindrical housing which the fluid enters through an input port. The housing has an output port through which, in the normal mode, the filtered fluid exits the housing. In the normal mode, the fluid passes through a main filter element, cylindrical in shape, within the housing and which is in a first axial position. The main filter element is mounted such that it can translate axially from this first position to a second position. A filter spring applies force to the main filter element to hold it in its first position. In the normal mode the fluid flow is radially inward through the main filter element and then to the outlet port, so contaminants gather on the outer surface of the filter element.

The Braukmann filter enters its backflush mode when a backflush valve is opened. With fluid pressure at the inlet port, opening the backflush valve creates a change in axial pressure gradient on the main filter element which urges the element against the force of the filter spring to the second axial position. With the main filter element in its second axial position, fluid flow is altered to flow from the inlet port through an auxiliary filter, and then to both the outlet port and to a backflush element within the main filter element. The backflush element can rotate within the main filter element and has a duct with an opening which receives fluid flow from the input port. At least some of the fluid flow from the inlet port is diverted through the backflush element. The backflush element channels this fluid to a pair of slits extending axially along the entire interior length of the main filter element and positioned close to its interior surface. In backflush mode, fluid flows radially outwards from the backflush element slits through the main filter element and then through the backflush valve. The backflush element includes an impeller through which fluid flows while the backflush mode exists. This impeller causes the backflush element to rotate while fluid is flowing through it.

Operation of this apparatus in the backflush mode radially directs pressurized jets of fluid against the inside surface of the main filter element, cleaning the main filter element and causing debris which has accumulated on its outer surface to be flushed though the backflush valve with the exiting fluid. Cleaning of the auxiliary filter does not take place in this prior art filter.

It is therefore the object of the present invention to improve the Braukmann filter so that the backflush mode also backflushes the auxiliary filter.

BRIEF DESCRIPTION OF THE INVENTION

A fluid filter assembly which can backflush both the auxiliary filter element and the main filter element includes a filter housing having first and second internal annular sealing surfaces, an inlet port for receiving unfiltered pressurized fluid and introducing same into the housing, and an outlet port for providing filtered pressurized fluid from the housing. A cylindrical filter element is mounted within the housing and has a first end and a second end. The filter element has an exterior surface and with the filter housing defines an inlet chamber. The filter element has an interior surface defining an interior filter space receiving fluid from the housing.

A rotor is mounted for rotation within the filter, and has a pump vane having a tip in constant proximity to the filter element as the rotor rotates. Means are provided for rotating the rotor at a speed sufficient for the pump vane to generate counterflow radially outwards through the filter element, of fluid flowing into the interior filter space from the inlet chamber. This outwardly flowing fluid will dislodge debris which has collected on the exterior surface of the filter element, so that it can be flushed away.

In a preferred embodiment which is adapted to enhance the operation of the Braukmann filter, the rotor includes a shaft carrying the pump vane. The rotor rotating means comprises a turbine vane connected to the rotor shaft. Within the housing, there is a duct carrying pressurized fluid from the inlet port to the turbine vane. This pressurized fluid applies force to the turbine vane and creates torque causing the rotor shaft to rotate at the filter cleaning speed. In a further modification, the duct which carries the pressurized fluid is within the rotor shaft itself, and the turbine vane has a slit opening into this duct and extending to the tip of the turbine vane. Fluid flows outwardly from the duct through the turbine vane slit creates torque which causes the rotor to rotate.

DESCRIPTION OF THE PREFERRED EMBODIMENTS

Figures 1, 1A:
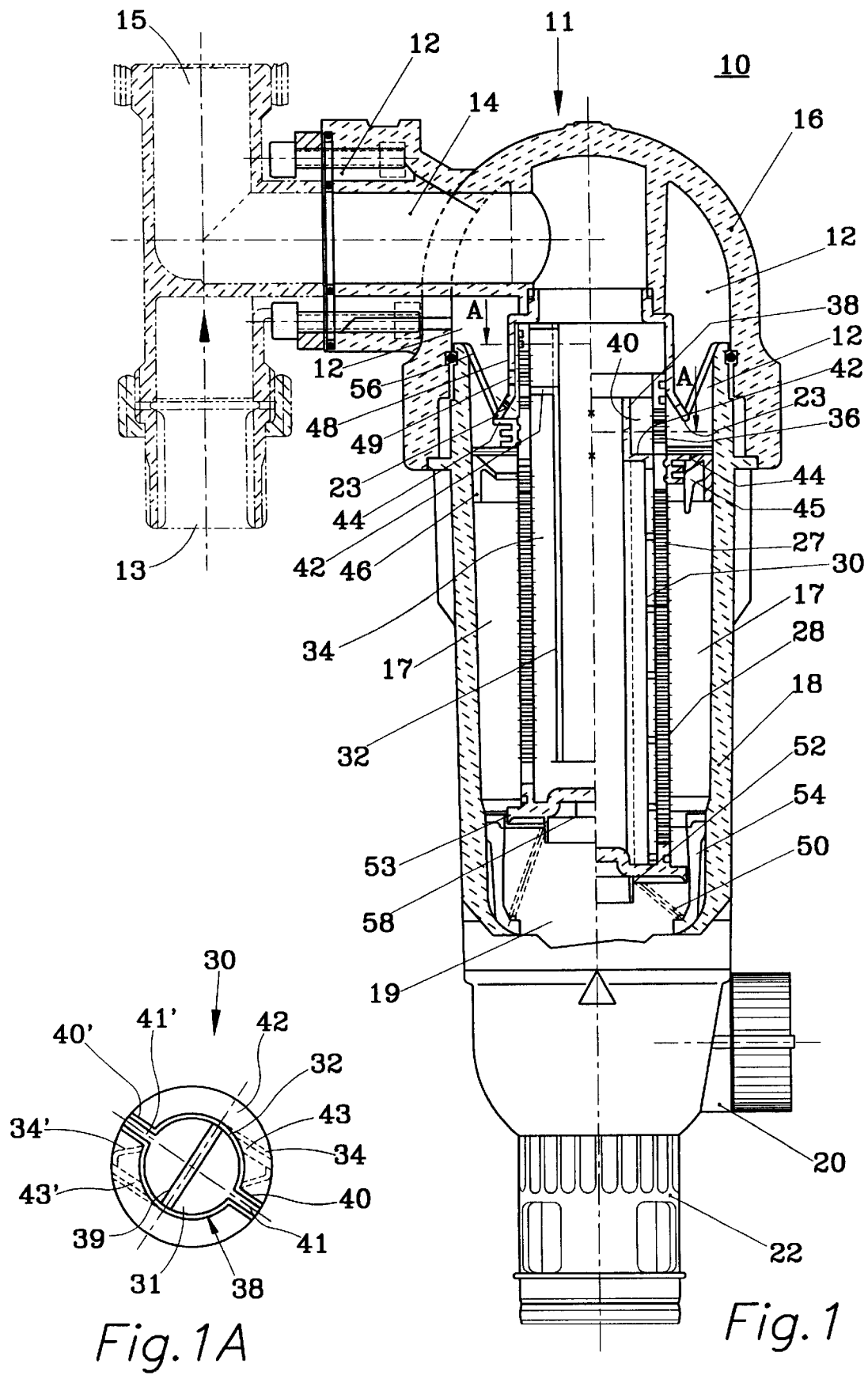
FIG. 1 is a vertical, longitudinal section of the filter assembly showing on the left side of the filter housing the filter element in its normal position assumed during the normal mode of operation, and on the right side of the filter housing, the filter element in its backflush position assumed during the backflush mode of operation.
FIG. 1A is a sectional view along line A—A in FIG. 1 showing details of a rotor within the filter element.

The filtering apparatus 10 shown in FIG. 1 is suitable for filtering particulate debris from a fluid such as water, and can be used in applications such as municipal water supply systems and home water supplies. Apparatus 10 is particularly suitable for any fluid filtering application which requires periodic cleaning of a filter without interrupting the flow of filtered fluid to the user and without disassembling the filtering apparatus.

Filtering apparatus 10 is shown in FIG. 1 as having a generally cylindrical filter housing 11 which encloses the various operating elements including a filter element 27. A part of housing 11 is shown in cross section with the filter element 27 in two different positions corresponding to two different operating modes. The left hand side of housing 11 is shown with the operating elements in normal operating mode. The right hand side of housing 11 is shown with the operating elements in backflush mode.

Housing 11 includes a upper portion 16 and a cylindrical lower portion 18 which have threaded mating surfaces allowing them to be joined with each other by screwing the lower portion 18 into the upper portion 16. A gasket interposed between portions 16 and 18 is compressed when they are threaded into each other thereby creating a fluid-tight seal between them. I prefer that the lower portion be made of a transparent plastic material in order for the internal elements of the filter housing 11 to be visible from the outside.

Housing 11 has in its upper portion 16 an inlet port 13 for connection to a first pipe (not shown) which serves as a source of pressurized unfiltered fluid to filtering apparatus 10. Upper portion 16 of housing 11 also has an outlet port 15 for connection to a second pipe (not shown) for distributing pressurized filtered fluid to a user. It is easy to design upper portion 16 with inlet port 13 located on one side of housing 11 and outlet port 15 on the other side thereof, with ports 13 and 15 axially aligned. Housing 11 has an internal space generally divided into an inlet chamber 12 and an outlet chamber 14. Inlet port 13 is in flow communication with inlet chamber 12 and outlet port 15 is in flow communication with outlet chamber 14. (The term "flow communication" is used here to mean that unrestricted fluid flow between the two indicated features can occur with no filter or other body interposed, and with no appreciable pressure drop, even though the channel or duct through which this flow occurs may not be evident in the drawing involved.) A number of areas shown in FIG. 1 are indicated with the reference number 12, and all of these are in flow communication with each other and with inlet port 13.

Figure 2:
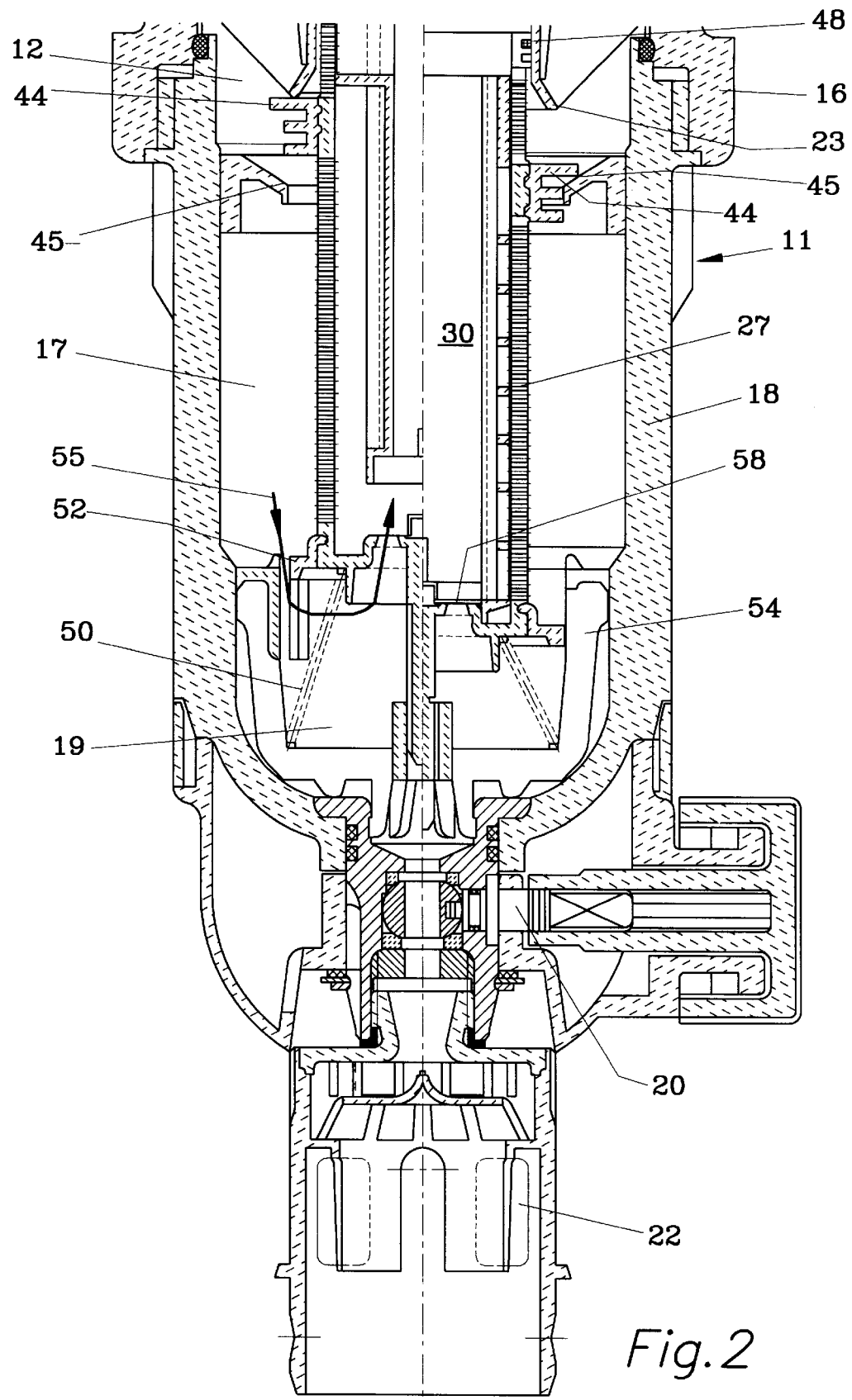
FIG. 2 is an enlarged section view of the bottom portion of the filter assembly, which shows the various elements therein.

Referring to FIGS. 1 and 2, a backflush valve 20 at the bottom of lower housing portion 18 is in flow communication with a backflush chamber 19. During normal operating mode shown on the left side of housing 11 backflush chamber 19 is in flow communication with inlet chamber 12. Valve 20 is externally adjustable between an open position allowing fluid within inlet chamber 12 to drain to the outside through backflush chamber 19 and a backflush port 22, and a closed position sealing the inlet chamber 12 from draining to the outside.

The filter element 27, which is preferably unitary, is held within housing 11. Filter element 27 has a cylindrical cross section as viewed from the top and in the direction of the vertical axis shown. An annular filter chamber 17 is defined between the outer surface of filter element 27 and the inner surface of lower housing portion 18. The upper end of filter element 27 is open and permits flow communication between the interior space of filter element 27 and outlet chamber 15. An annular fluid seal 56 encircles the top of the filter element 27. The lower end of filter element 27 is closed by an end fitting 52 which may have a small screen or mesh opening 58 allowing a amount of fluid flow between the interior of filter element 27 and backflush chamber 19.

An internal filter guide feature 48 in upper housing portion 16 has roughly the shape of an inverted cup and supports and radially restrains the upper end of filter element 27. The internal surface of feature 48 is circularly cylindrical and mates with the seal 56 at the top of filter element 27 to prevent fluid flow past seal 56. The space within feature 48 is in flow communication with outlet chamber 14 through an opening in the top (as shown in FIG. 1) of feature 48. This opening in feature 48 is defined by an annular ridge or shoulder 47 encircling the top of feature 48. Feature 48 also has an annular lip or seat 23 forming its bottom edge. A small annular clearance space is formed between the interior surface of feature 48 and the outer surface of filter element 27's upper end. An orifice 49 in feature 48 allows a limited amount of fluid to flow from inlet chamber 13 to this clearance space.

Lower housing portion 18 has in its bottom, its own internal filter guide feature 54, also cup-shaped but "normally" (i.e., with opening facing upward) oriented. Feature 54 supports and radially restrains the lower end 52 of filter element 27. Backflush valve 20 is located in the bottom of feature 54 and backflush chamber 19 forms the space within feature 54. A compression spring 50 is interposed between filter element end fitting 52 and the bottom of feature 54. Spring 50 applies constant force which urges filter element 27 upwardly so that during normal operation the upper end of filter element 27 is pressed against the downwardly facing "bottom" of feature 48, and filter element 27 has the position within housing portion 18 as shown on the left side of housing 11 in FIG. 1. Little fluid passing through orifice 49 can flow between the top of filter element 27 and the bottom of feature 48 when filter element 27 is in its normal position (left side of housing 11). End fitting 52, previously explained as closing the bottom end of filter element 27, has a flange 53 which loosely fits within feature 54, thereby holding filter element 27 approximately in the orientation shown. Filter chamber 17 is in open flow communication with backflush chamber 19. Filter element 27 can shift axially into the position shown in the right side of housing 11, but in normal operating mode the force of spring 50 is sufficient to hold filter element 27 in its normal position.

Filter element 27 is also part way down from the top, encircled by an annular seal 44 which beneath it defines a lower section of filter element 27 functioning as a main filter element 28 and above it an upper section functioning as an auxiliary filter element 36. In the normal position of filter element 27 shown on the left side of housing 11, seal 44 is axially positioned on filter element 27 to press against seat 23 of feature 48, and prevents flow of fluid from inlet chamber 12 to filter chamber 17. In the backflush position of filter element 27 as shown on the right side of housing 11, seal 44 cooperates with an annular backflush seat 45 carried on the interior of lower housing portion 18 to eliminate the flow communication between inlet chamber 12 and filter chamber 17.

A backflush rotor 30 shown in axial view from the top in FIG. 1A, is located within filter element 27. Rotor 30 performs the actual backflushing operation by rotating at a relatively high speed, perhaps 1000 RPM, and directing toward the interior of filter element 27, high pressure radial jets of fluid supplied at the inlet port 13. The length of rotor 30 is somewhat less than the total length of filter element 27. As shown in the left side of housing 11, the upper end of rotor 30 is in axial alignment with the upper end of filter element 27 when rotor 30 is in its normal operating position. The right side of housing 11 shows rotor 30 with its lower end pressing against the upper surface of end fitting 52 when in backflush mode.

FIG. 1A is extremely helpful in understand the structural details of rotor 30. There is a central hollow shaft 32 having an interior duct or bore 31 running its entire length and open at both the upper and lower ends. The amount by which the length of rotor 30 is less than the length of filter 27 is such as to allow flow communication between the interior filter space of filter element 27 and the open lower end of duct 31 when the top of rotor 30 is in its upwardmost position as shown in the right side of housing 11. A circular flange 42 is attached to the exterior of shaft 32 part way down from its top end. Flange 42 is positioned on shaft 32 to be axially offset slightly upwards from seal 44 when rotor 30 is in its normal (left side) operating position within filter element 27. The diameter of flange 42 is very slightly smaller than the inside diameter of filter element 27 and is intended to oppose flow communication within filter element 27 across and around flange 42.

Below flange 42 there is a turbine formed by vanes 34, 34' carried on and integral with shaft 32, and which generates the torque for spinning the rotor 30 during the backflushing operation. Vanes 34, 34' are preferably identical to each other and in diametrically opposed position on shaft 32. The tips of vanes 34, 34' are in close radial alignment with the periphery of flange 42, thus bringing these tips into close proximity to the interior surface of main filter element 28 along the entire axial length thereof. Each vane 34, 34' has "a pair of internal facing surfaces. Each pair of facing surfaces define between themselves" a respective slit 43, 43' running the entire axial length of vane 34 and 34'. The interior edge of each of these slits 43, 43' is in flow communication with the duct 31 of shaft 32. The outer edges of slits 43, 43' open into outlet chamber 14 in close proximity to main filter element 28. The slits 43, 43' have straight cross sectional shapes which are generally oriented at an angle to the radii which they intersect at their outer edges. Slits 43, 43' serve as flow restrictors, limiting the amount of fluid that can flow through duct 31.

Above flange 42 and integral with shaft 32 there is an outflow type centrifugal pump 38 comprising pump vanes 40, 40' each having its own slit 41, 41' respectively. The interior edges of these slits 41, 41' also open into duct 31. A crossplate 39 extends along a diameter of duct 31 and is attached at its edges to the wall defining duct 31. The tips of vanes 40, 40' are in radial alignment with the periphery of flange 42, and in close proximity to the interior of auxiliary filter element 36. Slits 41, 41' are shown as having straight line cross sections in radial alignment with the axis of shaft 32.

There are optional cross sectional shapes for slits 41, 41' and 43, 43'. In particular, well known principles of turbomachines suggest that these slits may have curved shapes which could improve their efficiency. The widths of the slits may also vary as a function of the radius to further improve operation.

During the normal mode of operation (filter element 27 in normal position as on the left side of housing 11), fluid flows under pressure into inlet chamber 12 through inlet port 13. Spring 50 has sufficient force to hold filter element in its normal position during the normal mode of operation. Fluid passing through main filter element 28 exerts upwards pressure on flange 42, forcing rotor 30 into its upward position where the top edges of pump vanes 40, 40' press against the shoulder around the top of feature 48. Filtered fluid within the interior filter space of main filter element 28 flows through duct 32, enters outlet chamber 14, and exits through outlet port 15. Debris suspended in the fluid is caught on the exterior of main filter 28, while the fluid flows through filter 28 to outlet chamber 14 and outlet port 15.

A small amount of fluid also flows through orifice 45 and into the clearance space between auxiliary filter 36 and feature 48. Fluid cannot flow into this clearance space from chambers 12 or 17 because of the fluid tight contact between seal 44 and seat 23. The fluid in this clearance space cannot enter outlet chamber 14 because of seal 56. The fluid in this clearance space is also filtered, but by the auxiliary filter 36, which accretes on its outer surface in the clearance space, the debris in this fluid. The fluid flowing through auxiliary filter 36 mingles with the fluid flowing through main filter 28 and also exits through the outlet port 15.

During normal mode of operation, fluid also flows around and past flange 53 into the backflush chamber 19. A small amount of fluid can flow through the screen 58 if it is present, as shown by flow arrow 55 (see FIG. 2) indicating this path. If no screen 58 is present, then little fluid exchange occurs between filter chamber 17 and backflush chamber 19.

Over a period of time, debris will accumulate on the outer surface of filter element 27. This debris will clog the openings in filter element 27, reducing the flow of fluid and the pressure available at outlet port 15 when the flow rate is large. It is necessary to remove this debris in some way, and the operation of the filter assembly 10 during the backflush mode performs this removal.

Backflush mode for assembly 10 is initiated when backflush valve 20 is opened. With valve 20 open, the fluid in backflush chamber 19 starts to drain through valve 20 to backflush port 22, reducing the pressure in backflush chamber 19 and filter chamber 17. The reduced amount of fluid present in chambers 17 and 19 along with the pressurized fluid which continues to flow through orifice 49 into auxiliary filter 36 causes downwardly directed pressure on flange 42. Rotor 30 is forced into its lower position as shown on the right side of housing 11 by this pressure on flange 42. The force on flange 42 is transmitted through the bottom end of rotor 30 to end fitting 52 and filter element 27. This force drives filter element 27 against the force of spring 50 into the backflush position shown in the right side of housing 11. With the bottom end of rotor 30 pressing against end fitting 52, there is no longer flow communication between duct 32 and the interior filter space of main filter element 28. Also, in the backflush position, annular seal 44 mates with seat 45 to close off filter chamber 17 from inlet chamber 12, and seal 44 loses temporarily its mating position with seat 23. And in the backflush position, auxiliary filter 36 drops out of its opposing position within feature 48 and instead forms part of the surface defining inlet chamber 12.

During the backflush mode, little or no fluid can flow from inlet chamber 12 into filter chamber 17, because of the seal formed between seat 45 and seal 44. Pressurized fluid in inlet chamber 12 during the backflush mode instead continues to flow through auxiliary filter element 36 into outlet chamber 14. By flowing into outlet chamber 14 during the backflush mode, the flow of filtered water to outlet port 15 is not interrupted during the backflushing operation, although the more limited area of auxiliary filter element 36 may cause a reduction in flow rate and pressure.

The pressurized fluid from inlet chamber 12 is also used for backflushing main and auxiliary filter elements 28 and 36 during a backflushing episode. The fluid which flows into outlet chamber 14 can also flow unimpeded into the top, open end of filter element 27. Because of the presence of flange 42, little fluid can flow axially through the interior space of auxiliary filter element 36 into main filter element 28 outside of duct 31. Thus most of the fluid passing inwardly through auxiliary filter element 36 enters the top opening of duct 31 and flows axially through it. Because of the pressure of the fluid on flange 42, the bottom end of shaft 32 is pressed against the top surface of end fitting 52, sealing the open bottom end of duct 31 and preventing more than a slight amount of fluid leakage through the bottom opening of duct 31 into the interior filter space of filter element 27. There is however, limited fluid flow through screen 58 into backflush chamber 19, thereby cleaning screen 58 also. The fluid entering the part of duct 31 into which slits 43, 43' open, flows into these slots and exits from their outside openings adjacent to the inside of main filter element 28. This fluid exits at high speed from slits 43, 43' and creates a tangential reactive force and consequent torque causing rotor 30 to spin at a relatively high speed, as mentioned earlier perhaps 1000 RPM or even more. Thus, two narrow elongated jets of pressurized fluid sweep around the interior of main filter element 28, causing even strongly adhering previously trapped debris on the exterior of main filter element 28 to become dislodged and be flushed from filter chamber 17 into backflush chamber 19 and out of housing 11. The impulse force created by these two exiting jets of fluid causes rotor 30 to rotate at a relatively high rate of speed, which I call the filter cleaning speed, and which may be on the order of 1000 RPM.

Auxiliary filter element 36 is also cleaned of debris on its exterior surface by a counterflow mechanism operating during a backflushing episode. The high rotational speed of rotor 30 spins pump 38. Because of the inflowing fluid within auxiliary filter element 36, the space within duct 31 adjacent the interior edges of slits 41, 41' is filled with fluid. Further, the flow restrictions provided by slits 43, 43' in vanes 34, 34' assure that the space within auxiliary filter element 36 and duct 31 are always filled with fluid during a backflushing episode. Crossplate 39 causes the column of fluid within duct 31 and adjacent to slits 41, 41' to rotate at essentially the speed of rotor 30. The centrifugal force resulting from this rotation causes this fluid to be ejected at high speed in narrow, axially elongated jets from the exterior edges of slits 41, 41'. These jets of fluid sweep across the interior surface of auxiliary filter element 36. The fluid in the jets penetrate auxiliary filter element 36 from the inside to the outside, dislodging debris trapped on the exterior surface thereof. The velocity of the fluid ejected from the edges of slits 41, 41' is much greater than the velocity of the fluid inflowing through auxiliary filter element 36, so there is a strong outflow of fluid through element 36 at the tips of vanes 40, 40'. Accordingly, this ejected fluid easily can penetrate the orifices of auxiliary filter element 36 and loosen the debris adhering thereto. Because the purpose of this arrangement is to clean auxiliary filter element 36, I refer to a speed of rotation for rotor 30 sufficient to allow the jets emanating from slits 41, 41' to clean auxiliary filter element 36 as the filter cleaning speed of rotation.

It should be noted that in this embodiment, the debris dislodged from the exterior of auxiliary filter element 36 by the jets of fluid from pump 38 is not immediately flushed from the housing 11. It is trapped in inlet chamber 12 during the backflushing episode because of the seal between seat 23 and seal 44. When backflush valve 20 is closed and backflushing ends, main filter element 27 returns to its normal position as shown on the left side of housing 11. The debris previously dislodged from auxiliary filter element 36 remains in suspension in the fluid within inlet chamber 12. As the space reopens between seat 45 and seal 44, the debris-holding fluid in chamber 12 flows into filter chamber 17, where it is trapped on main filter element 28 as soon as a demand for fluid arises. The next backflushing episode then dislodges this debris along with any other debris trapped on the exterior surface of main filter element 28 and flushed it from housing 11. In this way, all of the debris which collects on the exterior surface of auxiliary filter element 36 and can be detached by backflushing, is eventually flushed away. Thus, little debris can accumulate on auxiliary filter element 36 over a number of backflushing episodes to reduce the amount of fluid flow during these episodes.

The preceding has described my invention and forms the basis for the following claims:

I claim:

1. A self-cleaning fluid filter assembly comprising
    i) a filter housing having an inlet port for receiving pressurized fluid and introducing same into an inlet chamber of the housing, an outlet chamber separate from the inlet chamber, and an outlet port in flow communication with the outlet chamber:
    ii) a cylindrical filter element having an inside diameter and having a backflush position within the housing, and defining within itself an interior filter space separated from the inlet chamber by the filter element, said interior filter space receiving through the filter element, fluid from the inlet chamber, and said interior filter space in flow communication with the outlet chamber;
    iii) a shaft having first and second ends mounted for rotation within the interior filter space, and having a circular flange between the first and second ends having a diameter substantially equal to the filter element's inside diameter, said shaft further having a duct extending from the first end axially through the shaft toward the second end, and in flow communication with the interior filter space at the first end;
    iv) a turbine vane mounted on the shaft between the flange and the second end to rotate therewith, said vane having an outer edge which moves in close proximity to the filter element while the shaft rotates, and a slit in the turbine vane in flow communication with the duct and extending to the outer edge of the turbine vane, said slit angled with respect to a radius of the shaft to cause shaft rotation when fluid flows therethrough;
    v) a pump vane mounted on the shaft between its first end and the flange to rotate therewith, said pump vane having an outer edge which moves in close proximity to the filter element while the shaft rotates,
    whereby when the filter element is in the backflush position, pressurized fluid filtered by the filter element divides to flow both to the outlet chamber and to the slit in the turbine vane.

2. The assembly of claim 1, including a seal on the outside of the filter element, wherein the filter element can axially translate between the backflush position and a normal position, and wherein the shaft duct extends from the first to the second end of the shaft, and wherein the housing includes a first feature mating with the seal while the filter element is in its backflush position, and directing fluid flow from the inlet chamber inwardly through the filter element between the flange and the first end of the shaft, and a second feature axially spaced from the first feature, with which the seal mates when the filter element is in its normal position, which while so mated directs fluid flow from the inlet chamber inwardly through the filter element between the flange and the shaft's second end and into the shaft duct at the shaft's second end.

3. The assembly of claim 2, wherein the filter housing includes a backflush valve which can be opened and closed, and in flow communication with the inlet chamber when closed, and having an open state allowing fluid to flow from the interior filter space through the filter to outside of the housing, and wherein the filter element has an end fitting closing the interior filter space in the vicinity of the shaft's second end, wherein when the backflush valve is closed and the filter element is in its normal position, fluid from the inlet chamber flows through the filter element and the shaft duct to the outlet chamber, and when the backflush valve is open and the filter element is in its backflush position, fluid flowing through the slit in the turbine vane flows radially outward through the filter element and through the backflush valve.

4. The assembly of claim 3, wherein the shaft has within the filter element a first position with its second end spaced from the end fitting, and a second position with the duct's second end pressed against the end fitting, said first and second positions of the shaft controlled by fluid pressure on the flange, and said fluid pressure controlled by the backflush valve state.

5. The assembly of claim 4, wherein the seal and the housing's first and second features are all annular.

6. The assembly of claim 5, including a spring having a first end mounted within the housing and a second end contacting the filter element said spring urging the filter element into its normal position.

7. The assembly of claim 6 wherein the spring is a compression spring mounted at an end of the filter element.

* * * * *